United States Patent [19]

Hausmann

[11] Patent Number: 5,721,314
[45] Date of Patent: Feb. 24, 1998

[54] THERMOFORMABLE THERMOPLASTIC POLYMER ALLOY COMPOSITIONS

[75] Inventor: Karlheinz Hausmann, Neuchatel, Switzerland

[73] Assignee: E. I. du Pont de Nemours and Company, Wilmington, Del.

[21] Appl. No.: 570,371

[22] Filed: Dec. 11, 1995

Related U.S. Application Data

[63] Continuation of Ser. No. 283,491, Aug. 1, 1994, abandoned, which is a continuation of Ser. No. 163,387, Dec. 7, 1993, abandoned.

[51] Int. Cl.⁶ .................................................. C08L 51/00
[52] U.S. Cl. ................................. 525/71; 525/74; 525/78
[58] Field of Search ................................ 525/71, 74, 78

[56] References Cited

U.S. PATENT DOCUMENTS

| | | | |
|---|---|---|---|
| 3,835,201 | 9/1974 | Fischer. | |
| 4,528,329 | 7/1985 | Inoue et al. | 525/78 |
| 4,871,810 | 10/1989 | Saltman | 525/133 |
| 4,945,005 | 7/1990 | Aleckner et al. | 428/500 |
| 4,968,752 | 11/1990 | Kawamoto et al. | 525/194 |
| 4,997,720 | 3/1991 | Bourbonais et al. | 428/500 |
| 5,051,478 | 9/1991 | Puydak et al. | 525/195 |
| 5,206,294 | 4/1993 | Dawson | 525/196 |
| 5,278,233 | 1/1994 | Abe et al. | 525/74 |

*Primary Examiner*—Mark L. Warzel
*Attorney, Agent, or Firm*—Craig H. Evans

[57] ABSTRACT

Thermoplastic polymer alloy compositions are provided comprising a blend of polypropylene, ethylene copolymer ionomer resin, ethylene/glycidyl acrylate or methacrylate copolymer, uncrosslinked ethylene propylene rubber, acid or anhydride grafted polypropylene, an agent for crosslinking the rubber and/or catalyzing an epoxide/acid reaction, and optionally a poly-α-olefin. The compositions are particularly useful for thermoforming of articles having high deep-draw ratios. The presence of the poly-α-olefin assists to improve embossing and grain retention of embossed sheets, particularly at high deep-draw ratios.

9 Claims, No Drawings

THERMOFORMABLE THERMOPLASTIC POLYMER ALLOY COMPOSITIONS

This is a continuation of application Ser. No. 08/283,491 filed Aug. 1, 1994, now abandoned which was a continuation of application Ser. No. 08/163,387 filed on Dec. 7, 1993 now abandoned.

This invention relates to thermoplastic polymer alloy compositions which are thermoformable and to thermoformed articles made from such compositions.

For many years films and laminates of polyvinyl chloride (PVC) resins have found utility in the production of thermoformed articles including, for example, videotape cases, food packaging, and beverage containers. In the automotive field PVC has been employed extensively in the fabrication of interior sheathing for automobiles, for example, in instrument panel skins, door panels, roof liners, and seat covers. Although performance has been adequate, there are certain disadvantages inherently associated with use of PVC in these applications. In particular, large amounts of plasticizers must be incorporated into the resin in order to enhance flexibility and low temperature properties, as well as to provide a soft surface texture. However, as a result of the high temperatures to which the interiors of parked automobiles are subjected, the plasticizers have a tendency to migrate to the surface of the PVC films and consequently the PVC sheathing becomes brittle. In addition, a film of plasticizer is gradually deposited on the interior surfaces of the automobile, particularly on the interior surfaces of the windows.

A more recently recognized disadvantage of the use of PVC concerns the difficulty of disposal and recycle of the resin. Incineration results in generation of significant quantities of hydrogen chloride and heavy metal residues. In addition, the resin is not compatible with other plastics used in the manufacture of automobiles, thereby creating problems during recycling operations.

Non-halogenated thermoplastic alloy compositions having good high temperature properties are known in the art, for example the polyolefin/ionomer blends disclosed in U.S. Pat. No. 4,871,810 or the blends of partially crosslinked ethylene/α-olefin copolymers with reaction products of ethylene copolymer ionomers and olefin/epoxy copolymers, disclosed in U.S. Pat. No. 4,968,752. Such compositions, however, are either deficient in softness or scuff resistance.

The deficiencies of the prior art compositions have been largely overcome by a composition comprising a blend of polypropylene, ethylene copolymer ionomer resin, ethylene/glycidyl acrylate or methacrylate copolymer, and uncrosslinked ethylene propylene rubber as described in U.S. Pat. No. 5,206,294. Such a blend has been proven suitable for most applications and it is characterized by good thermoformability and grain retention. However, it is desired to improve the ability to thermoform articles having deep-draw ratios, especially when embossing is carried out. In these cases, good grain retention is also required. Greater depth of embossing before thermoforming and greater absolute depth after thermoforming (grain retention) is desired.

SUMMARY OF THE INVENTION

In accordance with this invention thermoplastic alloys compositions are provided consisting essentially of a blend of (a) 10–40% by weight polypropylene;

(b) 15–50% by weight of an uncrosslinked ethylene propylene copolymer rubber having an ethylene content of 60–80% by weight;

(c) 10–50% by weight of an ionomeric copolymer of ethylene and an α, β-unsaturated $C_3$-$C_8$ carboxylic acid;

(d) 0.1–5% by weight of a copolymer of ethylene and glycidyl acrylate or glycidylmethacrylate;

(e) 0.1–10% by weight of a polypropylene grafted with 0.01–5% by weight of an α,β-unsaturated carboxylic acid or an anhydride thereof;

(f) 0.01–1.0% by weight of an agent which is (i) a crosslinking agent for the ethylene propylene rubber, (ii) a catalyst for reaction of epoxide groups with carboxylic acid or anhydride groups, or (iii) both (i) and (ii); and optionally (g) 0.1–30% by weight of a poly-α-olefin having a melting point in the range of 80°–130° C., said poly-α-olefin optionally grafted with 0.01–3% by weight of an α,β-unsaturated carboxylic acid or an anhydride thereof.

These compositions exhibit excellent high and low temperature properties, scuff resistance, softness and deep-drawability. The present invention is also directed to thermoformed articles from such compositions, particularly instrument panel skins.

DETAILED DESCRIPTION OF THE INVENTION

The polypropylene component of the alloy compositions of the invention consists of crystalline polypropylene and is intended to include in addition to the homopolymer those polymers that also contain minor amounts, usually not greater than 15 weight percent, of higher α-olefins, e.g., those containing 3–8 carbon atoms, such as butene, octene, etc. The polypropylene polymers useful in this invention have melt indices in the range of from about 1–400 grams/10 minutes (g/10 min.) measured at 230° C. employing a 2.16 kilogram (kg) weight and are present in the alloy composition in amounts of 10–40 percent by weight, preferably 10–25 percent by weight.

The thermoplastic polymer alloy contains about 15–50 weight percent, preferably 25–45 weight percent, of an uncrosslinked ethylene propylene copolymer rubber, preferably an ethylene/propylene non conjugated diene copolymer (EPDM). The non conjugated dienes can contain from 6–22 carbon atoms having at least one readily polymerizable double bond. The uncrosslinked ethylene/propylene copolymer rubber contains about 60–80 weight percent, usually about 65–75 weight percent ethylene. The amount of non conjugated diene is generally from about 1–7 weight percent, usually 2–5 weight percent. Preferably the ethylene/propylene copolymer rubbers are EPDM copolymers. EPDM copolymers that are especially preferred are ethylene/propylene/1.4-hexadiene, ethylene/propylene/dicylopentadiene, ethylene/propylene/norbornene, ethylene/propylene/methylene-2-norbornene, and ethylene/propylene/1.4-hexadiene/norbornadiene copolymers. It is important that the ethylene propylene copolymer rubber be non-crosslinked because this imparts enhanced scuff resistance to the polymer alloys.

The alloy compositions also contain 10–50 percent by weight, preferably 10–35 percent by weight of an ionic copolymer of ethylene, an α,β unsaturated $C_3$-$C_8$ carboxylic acid, and optionally, at least one softening comonomer that is copolymerizable with ethylene. Acrylic and methacrylic acids are preferred acid comonomers. The softening comonomer can be an alkyl acrylate selected from the group consisting of n-propyl, n-butyl, n-octyl, 2-ethylhexyl, and 2-methoxyethyl-acrylates. The preferred alkyl acrylates are n-butyl, 2-ethylhexyl, and 2-methoxyethyl-acrylates. The softening comonomer can also be an alkyl vinyl ether selected from the group consisting of n-butyl, n-hexyl, 2-ethylhexyl, and 2-methoxyethyl-vinyl ether. The preferred alkyl vinyl ethers are n-butyl vinyl ether and n-hexyl vinyl ether. The copolymer is about 10 to 70% neutralized with metal ions selected from groups Ia, Ib, IIa, IIIa, IVa, VIb, and VIII of the Periodic Table of Elements such as sodium, potassium, zinc, calcium, magnesium, lithium, aluminum, nickel, and chromium. Preferably the copolymer has from about 35 to about 70% of the carboxylic acid groups ionized by neutralization with metal ions selected from the group consisting of sodium, potassium, zinc, calcium and magnesium.

The thermoplastic polymer alloy contains about 0.1–5 weight %, preferably 1–3 weight %, of an ethylene/glycidyl acrylate or ethylene/glycidyl methacrylate copolymer. Optionally, and preferably, the ethylene/glycidyl acrylate or ethylene/glycidyl methacrylate copolymer contains copolymerized units of an alkyl acrylate or an alkyl methacrylate having 1–6 carbon atoms. The ethylene/glycidyl acrylate or ethylene/glycidyl methacrylate copolymer contains 60–88 weight percent ethylene and 1–12 weight percent glycidyl acrylate or glycidyl methacrylate. Representative alkyl acrylates and alkyl methacrylates that are used in the copolymer include methyl acrylate, ethyl acrylate, propyl acrylate, n-butyl acrylate, isobutyl acrylate, hexyl acrylate, methyl methacrylate, ethyl methacrylate, propyl methacrylate, butyl methacrylate, and hexyl methacrylate. Ethyl acrylate is preferred and n-butyl acrylate is especially preferred.

The ethylene/glycidyl (meth)acrylate, preferably containing an alkyl acrylate of 1–6 carbon atoms, can be prepared by direct polymerization, for example, copolymerizing ethylene, an alkyl acrylate, and glycidyl methacrylate or glycidyl acrylate in the presence of a free-radical polymerization initiator at elevated temperatures, generally 100°–270° C., usually 130°–230° C., and at elevated pressures, i.e., 140–350 MPa. The most preferred ethylene/ glycidyl (meth)acrylate copolymers that are used in this invention are copolymers of ethylene, ethyl acrylate, glycidyl methacrylate, and, especially, ethylene, n-butyl acrylate, and glycidyl methacrylate.

The alloy composition of the invention contains about 0.1–10% by weight, preferably about 0.1–5% by weight, of a polypropylene grafted with 0.01–5% by weight, preferably 0.1–1% by weight, of an α,β-unsaturated carboxylic acid or an anhydride thereof. Preferably the grafted polypropylene contains 0 to 5 weight percent calcium carbonate.

The base polypropylene used for grafting refers to homopolymers of propylene, optionally impact modified, high-ethylene (up to 25 weight percent), copolymer-type polypropylene, and to random copolymers of propylene with up to 8% by weight ethylene. In general, the precursor polypropylene has a relatively high molecular weight one having a melt index, measured at 2.16 kg and 190° C., of less than 1.5 g/10 min. being preferred.

The grafting monomer is at least one of α,β-ethylenically unsaturated carboxylic acids and anhydrides, including derivatives of such acids and anhydrides, and including mixtures thereof. Examples of the acids and anhydrides, which may be mono-, di- or polycarboxylic acids, are acrylic acid, methacrylic acid, maleic acid, fumaric acid, itaconic acid, crotonic acid, itaconic anhydride, maleic anhydride and substituted maleic anhydride e.g. dimethyl maleic anhydride. Examples of derivatives of the unsaturated acids are salts, amides, imides and esters e.g. mono- and disodium maleate, acrylamide, maleimide and diethyl fumarate. Maleic anhydride is preferred. Such grafted polypropylenes can be prepared as described in published European Patent Applications 370,735 and 370,736.

The grafting of the polypropylene can be carried out in the melt state, in solution or in suspension as described. The melt viscosity of the grafted polypropylene is not restricted, however, most preferred alloying is found if the melt index, measured at 2.16 kg and 190° C. is between 50 and 150 g/10 min. or if the melt flow index, measured at 2.16 kg and 230° C. is between 250 and 350 g/10 min., respectively.

A particularly preferred grafted polypropylene is a impact modified, high-ethylene, copolymer-type polypropylene which has been grafted with 0.6% maleic anhydride containing 4 weight percent calcium oxide, available from DuPont Canada Inc. as FUSABOND®P MZ-203D. This grafted polymer has a melt flow index of 250 g/10 min at 230° C./2.16 kg and a melting point of about 160° C.

The alloy composition of the invention also contains about 0.01–1% by weight, preferably about 0.01–0.5%, of an agent which either serves to crosslink the ethylene propylene rubber, or to catalyze the reaction of the epoxy groups in the ethylene/glycidyl (meth)acrylate copolymer with the carboxylic acid or anhydride groups in the grafted polypropylene. When the ethylene propylene rubber is a preferred EPDM copolymer rubber, the selected agent should be one which accomplishes both reactions. Such agents can be any of those known in the art to accomplish these functions and include primary, secondary and tertiary amines, quaternary ammonium salts, imidazole compounds, hydroxyl-containing compounds such as alkali metal hydroxides, borofluorates such as $Zn(BF_4)_2$, peroxides-particularly organic peroxides which are well known in the art. Preferred agents are the amines, particularly aliphatic amines or aromatic amines of 1–20 carbon atoms. Particularly useful amines include aminohexyl carbamic acid (Diak No. 1), dimethylamino- dodecane (DMDD) and triethanol amine (TEA) or any other tertiary amine.

The addition of a combination of a grafted polypropylene, a glycidyl (meth) acrylate functionalized polymer, and an amine crosslinking agent leads to an increase in melt viscosity of the alloy composition (higher melt strength, higher viscosity) and therefore leads to improved grain retention properties of embossed sheets. This is especially true where high deep drawing is used in making articles such as instrument panel skins.

The addition of 0.1–30% by weight of a poly-α-olefin having a melting point in the range of 80°–130° C. leads to a lower embossing temperature and deeper embossing depth. This component also contributes to improved grain retention of a finished instrument panel skin. The poly-α-olefin is a homo- or copolymer of α-olefins of the formula R—CH=CH$_2$ where R is hydrogen or an alkyl group of 1–8 carbon atoms and which has a density in the range of 0.88 and 1. Preferred polymers are polyethylenes such as HDPE and LDPE and copolymers of ethylene with octene and/or butene such as the so-called LLDPEs.

The poly-α-olefins such as the preferred LLDPEs and LDPEs are optionally grafted with 0.01–3% by weight, preferably 0.1–1% by weight, of an α,β-unsaturated carboxylic acid or an anhydride thereof. The grafting acid or anhydride used can be any of those described hereinabove for the grafting of polypropylene. Maleic anhydride is preferred. The grafted polyethylenes are prepared as described in published European patent applications 370,735 and 370,736.

The alloy compositions of the present invention are generally prepared by melt blending the polymeric components under high shear conditions, for example in an extruder. The various ingredients may first be combined with one another e.g., in a pellet blend, or they may be combined with one another via simultaneous or separate metering of the various components. They may also be divided and blended in one or more passes into separate sections of the mixing equipment.

The resultant compositions may be formed into sheets, or they may be molded into any desired shape. In particular, they may be thermoformed at high deep-draw ratios for use as instrument panel skins for automobiles. Excellent low temperature flexibility combined with scuff resistance, and high temperature resistance, enables these compositions to be useful in applications wherein a wide range of temperature and abrasive conditions are encountered.

The invention can be further understood by the following examples in which parts and percentages are by weight unless otherwise indicated.

EXAMPLES 1-7

Mixtures and amounts of components as given in Table 1 were tumble-mixed until a homogeneous blend was obtained. Each resultant dry blend was melt blended for 5 minutes in a Brabender internal mixer model No. W50H (volume 60 cm$^3$) at a temperature setting of 220° C., at which time a torque reading was taken. The mixer was driven and controlled by a Plasticorder PLE650 heating control and driving unit.

The components used in the blends set forth in Table 1 are as follows:

PP=a polypropylene homopolymer having a melt index of 4 g/10 min (ASTMD-1238, Condition L) and a melting point of about 180° C.

EPDM=a terpolymer of 70% ethylene, 26% propylene and 4% 1,4-hexadiene having a melting point in the range of 90°–100° C.

Ionomer=a 45% neutralized zinc ionomer of a terpolymer of 69.5% ethylene, 22% n-butyl acrylate, and 8.5% methacrylic acid having a melt index 1.4 g/10 min. (ASTM D-1238, Condition E) and a melting point of about 90° C.

EnBAGMA=a terpolymer of 66.7% ethylene, 28% n-butyl acrylate and 5.3% glycidyl methacrylate having a melt index of 12 g/10 min (ASTM D-1238, Condition E) and a melting point of about 80° C.

DI Amine=aminohexyl carbamic acid.

DMDD Amine=dimethylaminododecane

TEA Amine=triethanolamine

PP-g-MAH=an impact modified, high-ethylene, copolymer-type polypropylene which has been grafted with 0.6% maleic anhydride containing 4 weight percent calcium oxide, available from DuPont Canada Inc. as FUSABOND®P MZ-203D. The grafted polymer has a melt flow index of 250 g/10 min at 230° C./2.16 kg and a melting point of about 160° C.

PE=a LLDPE which is 92% ethylene and 8% n-octene having a melt flow index of 2.2 g/10 min at 190° C./2.16 kg and a melting point of about 110° C.

PE-g-MAH=a LLDPE grafted with 0.8–1% of maleic anhydride, and having a melt flow index of 1.4–2 g/10 min at 190° C. /2.16 kg, available from DuPont Canada Inc. as FUSABOND®E MB-226D.

The increase in melt viscosity of each blend over that of the control (see Table I for the parts by weight of each component in the blend as well as the control) is shown by an increase in torque in Table I. Torque values were not measured for Examples 5 to 7. With higher torque comes higher cross-linking and higher strain hardening effect. By strain hardening effect, it is meant that tensile strength increases with increasing elongation in a stress-strain experiment in the plastic deformation zone. The blends are thermoformable and have good embossing characteristics. Deeper embossing and higher absolute depth of embossing after thermoforming is expected, particularly in Examples 6 and 7. The blends can be thermoformed at high draw ratios with fewer defects than expected with the control.

TABLE I

| Component | Control | 1 | 2 | 3 | 4 | 5 | 6 | 7 |
|---|---|---|---|---|---|---|---|---|
| PP | 20 | 20 | 20 | 20 | 20 | 20 | 13 | 20 |
| EPDM | 43 | 43 | 43 | 43 | 43 | 43 | 30 | 43 |
| Ionomer | 33 | 33 | 33 | 33 | 33 | 33 | 33 | 11 |
| EnBAGMA | 2 | 2 | 2 | 2 | 2 | 2 | 2 | 2 |
| Amine: | | | | | | | | |
| DI | — | 0.1 | — | — | — | — | 0.1 | 0.1 |
| DMDD | — | — | 0.1 | 0.1 | 0.3 | — | — | — |
| TEA | — | — | — | — | — | 0.1 | — | — |
| PP-g-MAH | 2 | 2 | 2 | 2 | 2 | 2 | 2 | 2 |
| PE | — | — | — | — | — | — | 20 | 20 |
| PE-g-MAH | — | — | — | — | — | — | — | 2 |
| Torque* | 19.3 | 20. | 21 | 20.5 22.7* | 20.2 | N/A | N/A | N/A |
| Embossing Depth | Good | Good | Good | Good | Good | Good | Very Good | Very Good |
| Grain Retention | Fair | Good | Good | Good | Good | Good | Very Good | Very Good |

*Torque in Nm measured in a Plasticorder PLE 650 driven Brabender internal mixer Model Number W50H (55 g) at 220° C. (+/−4° C.) after 5 minutes blending time(**after 15 minutes).

I claim:

1. A thermoplastic polymer alloy composition consisting essentially of a blend of:

(a) 10–40% by weight polypropylene;

(b) 15–50% by weight of an uncrosslinked ethylene propylene copolymer rubber having an ethylene content of 60–80% by weight;

(c) 10–50% by weight of an ionomeric copolymer of ethylene and an α,β-unsaturated $C_3$-$C_8$ carboxylic acid;

(d) 0.1–5% by weight of a copolymer of ethylene and glycidyl acrylate or glycidylmethacrylate;

(e) 0.1–10% by weight of a polypropylene grafted with 0.01–5% by weight of an α,β-unsaturated $C_3$-$C_8$ carboxylic add or an anhydride thereof;

(f) 0.01–1.0% by weight of an agent which is (i) a crosslinking agent for the ethylene propylene rubber, (ii) a catalyst for reaction of epoxide groups with carboxylic acid or anhydride groups, or both (i) and (ii); and (g) 0.01–30% by weight of a poly-α-olefin having a melting point in the range of 80°–130° C., said poly-α-olefin optionally grafted with 0.01–3% by weight of an α,β-unsaturated $C_3$-$C_8$ carboxylic acid or an anhydride thereof.

2. The composition of claim 1 wherein the polypropylene grafted with carboxylic acid or anhydride thereof (component e) is a high-impact, polypropylene copolymer with up to 25 weight percent ethylene grafted with 0.1–1 weight percent maleic anhydride containing 0 to 5 weight percent calcium oxide.

3. The composition of claim 2 wherein the polypropylene (component a) is present in an amount of 10–25% by weight, the uncrosslinked ethylene propylene copolymer rubber (component b) is present in an amount of 25–45% by weight, the ionomeric copolymer of ethylene and an $\alpha,\beta$-unsaturated $C_3$-$C_8$ carboxylic acid (component c) is present in an amount of 10–35% by weight, and the copolymer of ethylene and glycidyl acrylate or glycidyl methacrylate (component d) is present in an amount of 1–3% by weight.

4. The composition of claim 3 wherein the ethylene propylene rubber is copolymer of ethylene, propylene, and 1,4-hexadiene, and the copolymer of ethylene and glycidyl acrylate or glycidyl methacrylate is an ethylene/n-butyl acrylate/glycidyl methacrylate copolymer.

5. The composition of claim 3 wherein the agent (component f) is a primary, secondary, or tertiary aliphatic amine or aromatic amine.

6. The composition of claim 2 wherein component g is a grafted poly-$\alpha$-olefin further containing a linear low density polyethylene or a low density polyethylene having a melting point in the range of 80°–130° C.

7. The composition of claim 6 wherein the poly-$\alpha$-olefin of component g is grafted with maleic anhydride.

8. A thermoformed article made from a composition according to claim 6.

9. The thermoformed article of claim 8 wherein the article is an instrument panel skin.

* * * * *